United States Patent [19]

Ford

[11] Patent Number: 4,722,598

[45] Date of Patent: Feb. 2, 1988

[54] DIAGNOSTIC MICROSCOPE SLIDE HAVING MULTIPLE SAMPLE WELLS AND COVER

[75] Inventor: Max M. Ford, 6501 Calle Lottie, Tucson, Ariz. 85718

[73] Assignees: Max M. Ford, Tucson, Ariz.; Ronald J. Roscioli, Aurora, Colo. ; a part interest

[21] Appl. No.: 938,011

[22] Filed: Dec. 4, 1986

[51] Int. Cl.⁴ .................. G02B 21/34; G01N 21/01
[52] U.S. Cl. ...................................... 350/536; 356/246
[58] Field of Search .................. 350/536, 534, 532; 356/246, 244

[56] References Cited

U.S. PATENT DOCUMENTS

| 4,245,907 | 1/1981 | Rosen | 356/246 |
|---|---|---|---|
| 4,364,632 | 12/1982 | Pullen | 350/536 |
| 4,387,972 | 6/1983 | Valencia | 350/536 |
| 4,405,202 | 9/1983 | Kimball | 350/589 |
| 4,407,570 | 10/1983 | Hayasaka | 350/529 |
| 4,414,197 | 11/1983 | Dussault | 350/536 |
| 4,431,276 | 2/1984 | Weber | 350/447 |
| 4,436,385 | 3/1984 | Fischer et al. | 350/529 |
| 4,441,793 | 4/1984 | Elkins | 350/536 |
| 4,453,807 | 6/1984 | Faulkner et al. | 350/529 |
| 4,580,896 | 4/1986 | Brickus et al. | 356/246 |
| 4,607,921 | 8/1986 | Miller | 350/536 |

FOREIGN PATENT DOCUMENTS 8817  1/1985  Japan ............................ 356/244

Primary Examiner—Jon W. Henry
Attorney, Agent, or Firm—Cahill, Sutton & Thomas

[57] ABSTRACT

A diagnostic microscope slide includes a base plate and a cover plate. The base plate has an upper surface from which a plurality of ring-shaped walls extend, each surrounding a shallow well for holding a biological sample. The portions of the base plate directly beneath each sample well form a thin transparent bottom lens that defines the bottom of that sample well. The cover plate includes an upper surface and a lower surface having a plurality of cover lens recesses into which the respective ring shaped walls extend when the cover plate is in place on the base plate. The top of each cover plate recess in the cover plate is defined by a thin transparent cover lens. The bottom surface of each cover lens rests on and forms a seal with the upper rim surface of the ring shaped wall, thereby preventing migration of biological sample material from one sample well to another. Alignment pins extend into holes of the base plate to provide a frictional, snap-fit attachment of the cover plate to the base plate, sealing various biological samples in the various sample wells.

12 Claims, 8 Drawing Figures

U.S. Patent   Feb. 2, 1988   Sheet 1 of 2   4,722,598
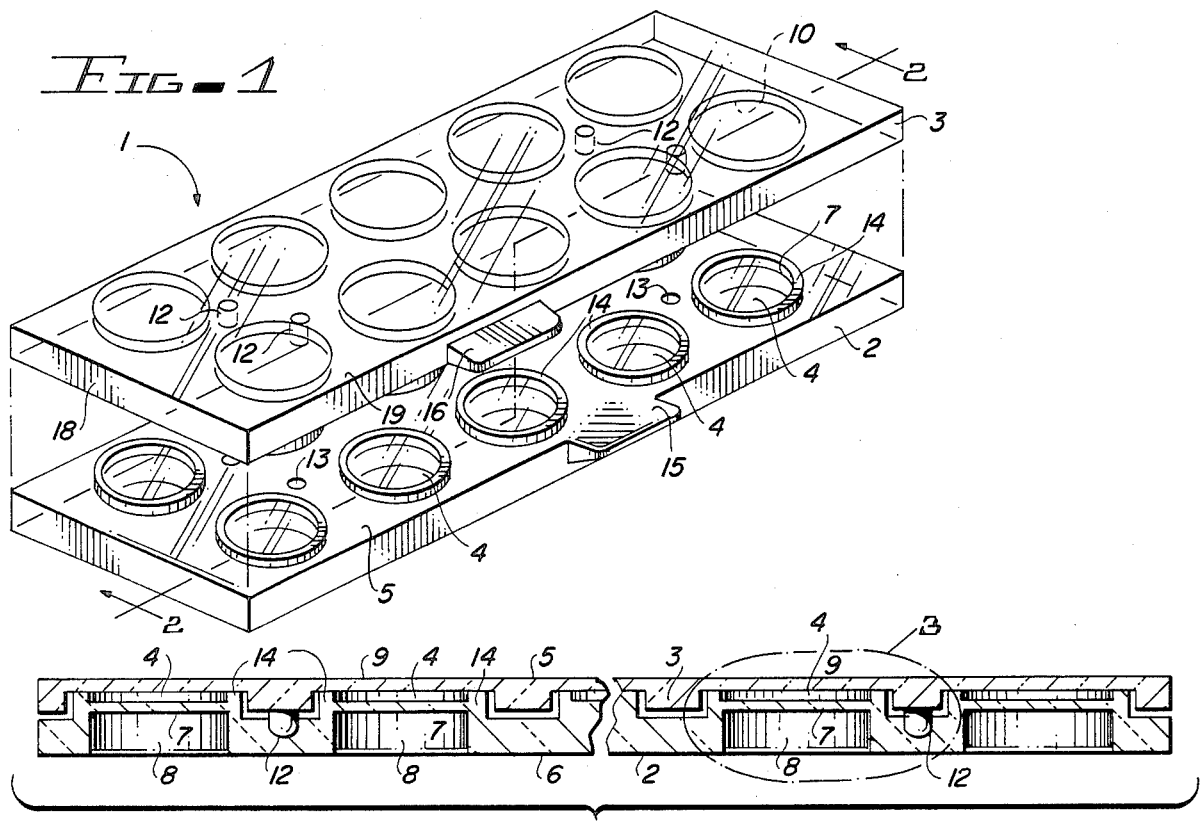
FIG-1
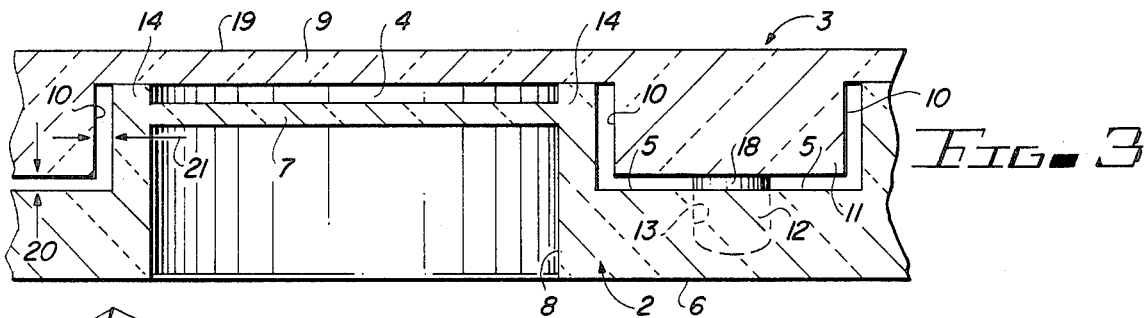
FIG-2
FIG-3
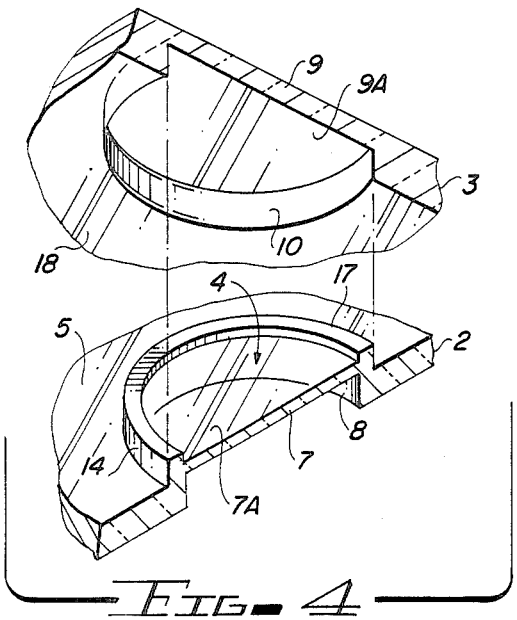
FIG-4

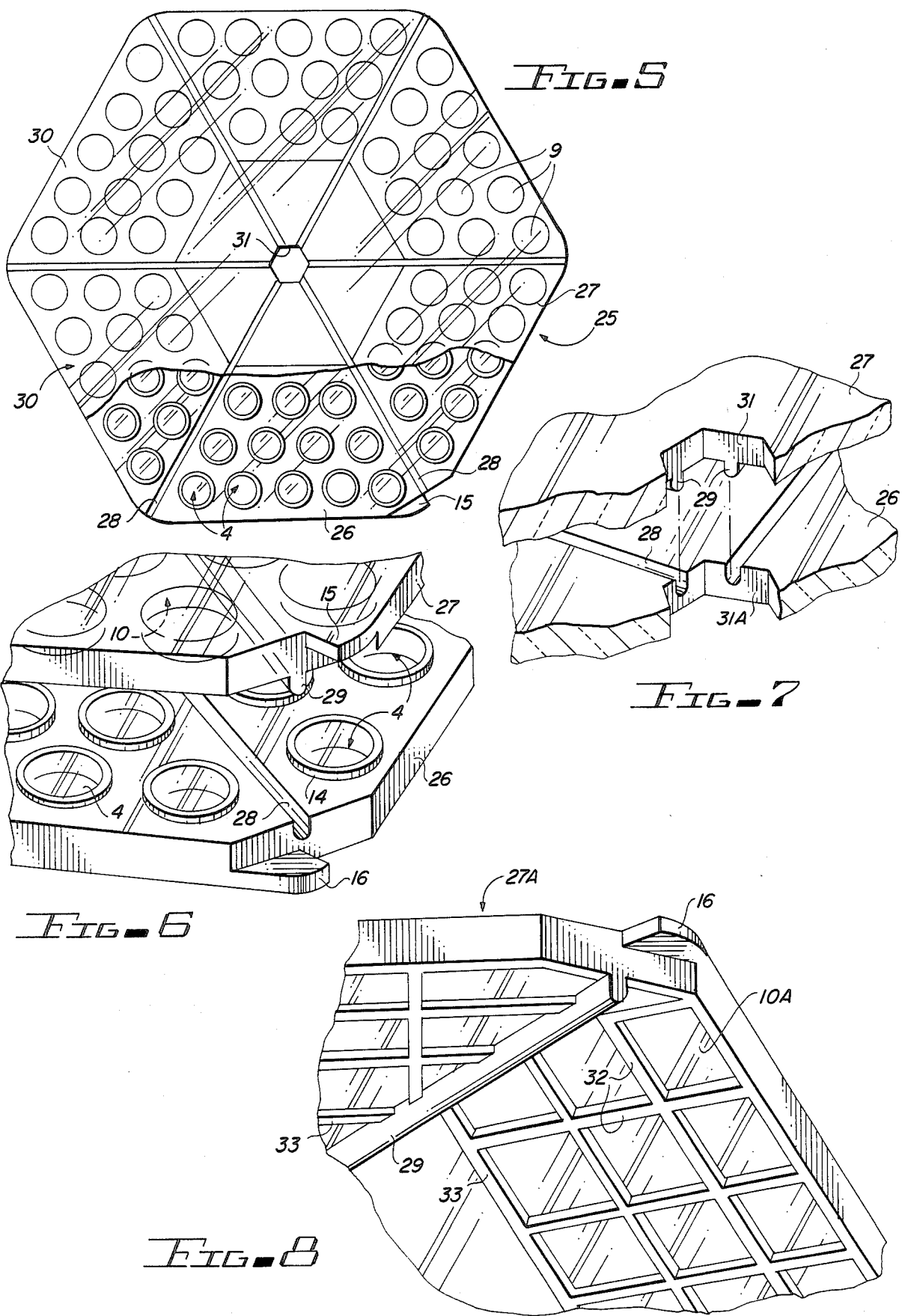

DIAGNOSTIC MICROSCOPE SLIDE HAVING MULTIPLE SAMPLE WELLS AND COVER

BACKGROUND OF THE INVENTION

The invention relates to microscope slides, and more particularly to microscope slides having the capability of containing and preserving many biological samples without cross contamination therebetween.

Microbiologists and other personnel employed by diagnostic laboratories and the like commonly perform various analyses of biological samples by viewing the biological samples on slides through microscopes. For some tests, large numbers of biological samples are required. In the past, single conventional rectangular glass microscope slides have been used, each supporting only a few separate biological samples. Typically, small amounts of petroleum jelly are dabbed on several locations of a single conventional glass microscope slide. A minute biological sample is placed within a well formed by each dab of petroleum jelly, and then a thin glass cover plate is pressed onto the top surface of the slide, smearing each biological sample and also the surrounding petroleum jelly, thereby sealing each sample and preserving it in condition for viewing through a high power microscope. A basic problem with the conventional approach to supporting samples on conventional glass slides is the very large number of microscope slides that must be identified, labelled, transported, and sold, and otherwise manipulated during the overall process of preparing and analyzing large numbers of biological samples. The cover plate has to be thin, in order to allow high power microscope lens to be moved close enough to the sample to bring it into focus without striking the upper surface of the cover plate. Nevertheless, it is not uncommon for microscope operators to hit the cover plate with the lens of a microscope during adjustment thereof, possibly squeezing some of the sample out of the region in which it is confined.

It is clear that there remains an unmet need for an economical, durable microscope slide which can be used to adequately prepare and preserve numerous biological samples in condition for observation by conventional high powered microscopes, to thereby reduce the amount of slide handling, and easing the tasks of preserving the identity and integrity of all of the biological samples.

SUMMARY OF THE INVENTION

Accordingly, it is an object of the invention to provide an improved diagnostic microscope slide having a plurality of rigid sample wells.

It is another object of the invention to provide an improved multiple well diagnostic microscope slide that avoids cross contamination between different biological samples.

It is another object of the invention to provide an improved diagnostic microscope slide that is adapted to use with an automated microscope stage.

It is another object of the invention to provide an improved diagnostic microscope slide which avoids damage to biological samples when a microscope lens accidentally strikes the microscope slide cover plate.

Briefly described, and in accordance with one embodiment thereof, the invention provides an improved diagnostic microscope slide that includes a base plate having a plurality of spaced, shallow sample wells each surrounded by a raised wall on the upper surface of the base plate, each sample well having a bottom formed by a thin lens in the base plate; the improved diagnostic microscope slide also includes a cover plate and a plurality of guides for aligning the cover plate with the base plate to effectuate a good mechanical fit of the cover plate to the base plate. The cover plate includes a plurality of thin cover lens each having an upper surface flush with the top surface of the cover plate and a bottom surface that forms the top of a cover lens recess in the bottom surface of the cover plate. The bottom surface of each cover lens rests on the rim of a respective one of the closed, ring-shaped walls, covering and sealing one of the sample wells when the cover plate is aligned with and closed on the base plate. Relatively thick portions of the cover plate between the lens recesses thereof extend downward between the sample well walls nearly to the upper surface of the base plate between the sample well walls. Edge tabs are provided on the cover plate and base plate, respectively, to facilitate removal of the cover plate from the base plate. In one embodiment of the invention, the base plate and cover plate are rectangular, the base plate including ten shallow cylindrical sample wells and the cover plate including ten aligned cylindrical cover lens wells. In another embodiment of the invention, the base plate and cover plate are hexagonal and each are divided into six triangular regions each of which includes 12 cylindrical sample wells. A center drive aperture is provided in the hexagonal base plate and cover plate for receiving a drive stud of a robotic mechanism that automatically rotates the hexagonal microscope slide beneath a microscope lens.

These and other objects of the invention will become apparent upon reference to the drawings and the following description of the preferred embodiments of the invention.

BRIEF DESCRIPTION OF THE DRAWINGS

FIG. 1 is a perspective exploded view of the microscope lens of the present invention.

FIG. 2 is a section view taken along section line 2—2 of FIG. 1.

FIG. 3 is an enlarged view of detail 3 of FIG. 2.

FIG. 4 is a partial perspective section view useful in describing the sample well bottom lens and cover lens of the device shown in FIG. 1.

FIG. 5 is a partial cutaway top view of an alternate embodiment of the invention.

FIG. 6 is a partial perspective view of the embodiment of the invention shown in FIG. 5.

FIG. 7 is a partial cutaway exploded view of the embodiment of the invention shown in FIG. 5.

FIG. 8 is a partial bottom perspective view of an alternate embodiment of the cover plate shown in FIG. 5.

DESCRIPTION OF THE INVENTION

Referring now to FIGS. 1-4, diagnostic slide 1 includes a base plate 2 and a cover plate 3, each of which can be composed of transparent styrene-acrylonitrite (SAN) material, which is available from various sources. The dimensions of the main body of base plate 2 and cover plate 3 can be three inches long by one inch wide by 0.03 centimeters thick.

Base plate 2 includes a plurality of cylindrical sample wells 4 located on its upper surface 5. Each of cylindrical wells 4 includes a surrounding ring-shaped wall 14 which is approximately 0.01 centimeters high. The bottom of each sample well 4 is formed by a bottom lens 7 that is integrally formed with base plate 2. The thickness of bottom lens 7 is approximately 0.005 centimeters. The bottom surface of lens 7 forms the top of a relatively deep lens recess 8 in the bottom of base plate 2 exposing the bottom surface of each lens 7. In the described embodiment of the invention, the inside diameter of the sample wells is approximately 0.9 centimeters, and the outside diameter of the ring shaped walls 14 is approximately 1.004 centimeters. The depth of each of the sample wells is about 0.002 centimeters.

Cover plate 3 has a flat upper surface 19 and a parallel flat bottom surface 18 (FIG. 3). A plurality of cover lens recesses 10 are disposed in the bottom surface 18 of cover plate 3. Each of the cover lens recesses 10 is slightly less deep than the heighth of ring shaped wall 14, and has an inside diameter of about 1.005 centimeters.

A plurality of alignment pegs 12 are attached to the bottom surface 18 of cover plate 3 and extend downward into and fit precisely with alignment holes 13 disposed in the top surface 5 of base plate 2. Thus, the cover plate 3 can be aligned with base plate 2, wherein each of the lens recesses 10 in the bottom surface of cover plate 3 is precisely aligned with the respective ones of the sample recesses 4, each of which contains a different biological sample. Cover plate 3 is then pressed onto base plate 2, the frictional fit between alignment pegs 12 and alignment holes 13 mechanically attaching cover plate 3 to base plate 2 in a press fit or a "snap-on" manner. With cover plate 3 pressed in place as shown in FIGS. 2 and 3, the upper rim surface 17 (FIG. 4) of each of the sample well walls 14 precisely engages and supports the peripheral bottom surface 9A of a respective one of the cover lens 9 of cover plate 3, effectively sealing the sample well 4 and any biological sample that has been placed therein. A tolerance, indicated by arrows 20 in FIG. 3, is maintained between the bottom surface 18 of cover plate 3 and the top surface 5 of base plate 2. Another tolerance, designated by arrows 21 in FIG. 3, is maintained between the inner walls of the cover lens recesses 10 and the side surfaces of the sample well walls 14. The first gap assures that the cover lens 9 always rest on wall rim 17, and thereby assures continuous sealing of the sample wells 4 by the cover lens 9. Both gaps provide a place for any leakage of liquid sample material to flow if the seal is broken. Any liquid of the sample that flows to the rim 17 of a sample well 4 and the peripheral portions of the lens bottom surface 9A resting thereon tends to enhance the sealing of that sample well by forming a "vacuum seal". The gaps designated by arrows 20 and 21 tend to prevent migration of the contents of one sample well to another.

To remove cover plate 3 from base plate 2, the user simply engages one of tabs 15 and 16 (FIG. 1) with his finger and the other with his thumb, and pries the cover plate upward from the base plate.

The above-described diagnostic slide has numerous advantages. The uniform thinness of the cover lens 9 and the bottom lens 7 avoids any optical distortion during microscopic observation of the sample contained in the various sample wells 4. The fact that the cover lens 9 rests on the upper surface 17 of the sample well walls 14 prevents damage to the sample in case the microscope lens accidentally strikes the upper surface of the lens cover 3. In the diagnostic slide of FIG. 1, ten different biological samples can be conveniently stored in a single slide, making it very easy for laboratory personnel to catalog and identify the various samples and to safely store and transport them. Both the cover plate and the base plate can be produced using state of the art molding techniques with the above-indicated material. The provision of the thin cover lens 9, the deep lens recesses 10, and the elevated bottom lens 7, which, in some instances may have its upper surface considerably higher than the upper surface 5 of bottom plate 2 as shown in FIG. 3, allows provision of a rigid structure for cover plate 3 and yet allows the biological sample to be placed near the top of the cover plate 3 so that high powered practical microscopes can have their lens lowered sufficiently closely to the sample in the sample well to adequately magnify it without striking the top of the cover lens 9.

Referring now to FIG. 5, an alternate embodiment of the invention is designated by reference numeral 25. In this embodiment of the invention, both the base plate 26 and the cover plate 27 are hexagonal. Each is divided into six generally trapezoidal subdivided regions 30. Each trapezoidal region 30 includes twelve sample wells having the same structure previously described with reference to FIGS. 1-4. The trapezoidal regions are separated from each other by dividers comprised of grooves 28 in base plate 26 and closely fitting ridges 29 disposed on the bottom surface of top plate 27. The ridges 29 fit in a sealing relationship into the grooves 28, eliminating the possibility of spillage of sample material from one trapezoidal region to the other.

As seen in FIGS. 5 and 6, lens 9 are provided in lens recesses 10 in cover plate 27 in precisely the same fashion as in the embodiment of FIGS. 1-4. Similarly, lens recesses beneath the bottom lens in the sample wells 4 of FIG. 6 are provided in the same manner as in the embodiment of FIGS. 1-4. The tabs 15 and 16 are provided at one or more of the apexes of the diagnostic slide 25, as best seen in FIG. 6, and peform the same function as in FIG. 1.

A hexagonal or otherwise suitably shaped center hole 31 is provided in cover plate 27 as shown in FIG. 7, and a similar hexagonal hole 31A is provided in base plate 26. This hexagonal hole can be used to receive a closely fitting hexagonal drive element of an automated microscope stage (not shown) which, in response to a suitable control signal, rotates the hexagonal microscope slide 25 to position a new one of the trapezoidal sections 30 beneath the microscope lens to facilitate automated handling and positioning of the various biological samples beneath the appropriate microscope lens.

While the invention has been described with reference to a particular embodiment thereof, those skilled in the art will be able to make various modifications to the described structure without departing from the true spirit and scope of the invention. For example, the lens and lens recesses need not be circular and cylindrical as indicated in FIGS. 1-6, but may be rectangular, as indicated in FIG. 8. In FIG. 8, square and/or rectangular lens recesses 10a are shown in the bottom surface of cover plate 27a. Cover plate 27a can be positioned over and fitted onto base plate 26 of FIGS. 5 and 6 to provide an adequate sealing relationship with the cylindrical sample well walls 14.

I claim:
1. A multiple-well diagnostic slide comprising:
(a) a base plate having a top surface and a bottom surface parallel to the top surface, and a plurality of shallow sample wells disposed in the top surface of said base plate, each sample well being defined by a closed wall extending above the top surface of said base plate and surrounding that sample well, each sample well also being defined by a thin bottom lens, a bottom surface of each bottom lens forming the top of a relatively deep lens recess disposed in the bottom surface of said base plate;

(b) a cover plate having a flat top surface and a bottom surface, and a plurality of lens recesses disposed in the bottom surface of said cover plate and each aligned with respective ones of said sample wells, the top of each of said lens recesses of said cover plate being bounded by a thin cover lens disposed in said cover plate; and (c) means for attaching said cover plate in aligned relationship with said lower plate to cause each of said cover lens to cover and seal a respective one of said sample wells.

2. The multiple-well diagnostic slide of claim 1 wherein the bottom lens of each of said sample wells is elevated higher than the top surface of said base plate.

3. The multiple-well diagnostic slide of claim 2 wherein said bottom surface of said cover plate extends nearly to the top surface of said base plate.

4. The multiple-well diagnostic slide of claim 3 wherein said closed walls each are generally cylindrical and have a precisely planar upper rim surface, the peripheral portion of the lower surface of each cover lens being precisely planar and being supported on said upper rim surface to effectuate a good seal therewith.

5. The multiple-well diagnostic slide of claim 4 wherein each of said cover lens is integral with said cover plate and each of said bottom lens and each of said closed walls is integral with said base plate.

6. The multiple-well diagnostic slide of claim 5 wherein said cover plate and said base plate are composed of transparent plastic.

7. The multiple-well diagnostic slide of claim 6 wherein the thicknesses of said cover lenses and said bottom lenses are approximately 0.005 centimeters.

8. The multiple-well diagnostic slide of claim 7 wherein the depths of said sample wells are approximately 0.002 centimeters.

9. The multiple-well diagnostic slide of claim 8 wherein said base plate and said cover plate are rectangular, and said base plate includes ten sample wells.

10. The multiple-well diagnostic slide of claim 8 wherein said base plate and said cover plate each are hexagonal, and said base plate includes six generally trapezoidal regions and containing a plurality of said sample wells, said base plate including means for separating each of said trapezoidal regions from the others.

11. The multiple-well diagnostic slide of claim 10 wherein said base plate and said cover plate each have an aperture therein for receiving a drive element of a slide support mechanism to effectuate rotating said multiple-well diagnostic slide.

12. The multiple-well diagnostic slide of claim 1 wherein said alignment means include pegs on one of said cover plate and said base plate and mating holes in the other thereof.

* * * * *